(No Model.)
G. T. REED.
BICYCLE WHEEL.
No. 476,216. Patented May 31, 1892.
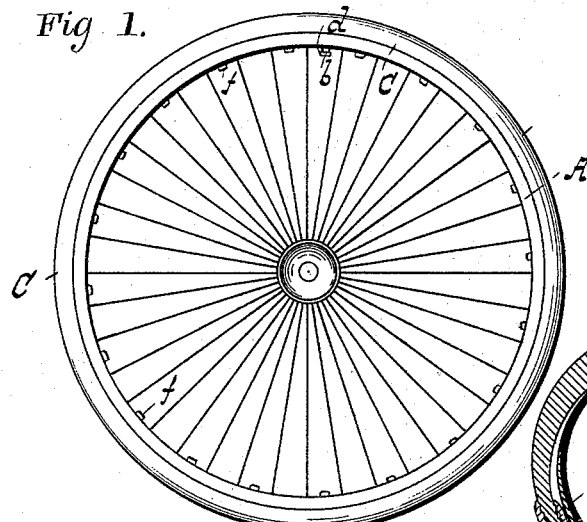
Fig. 1.
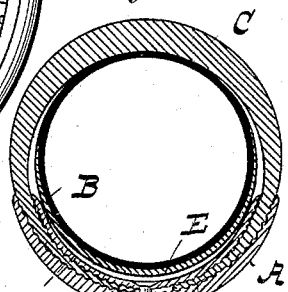
Fig. 3.
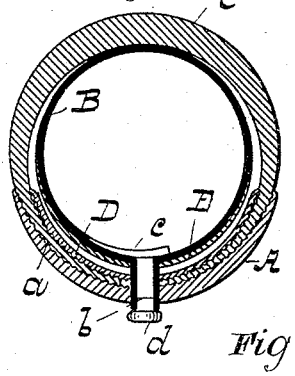
Fig. 4.
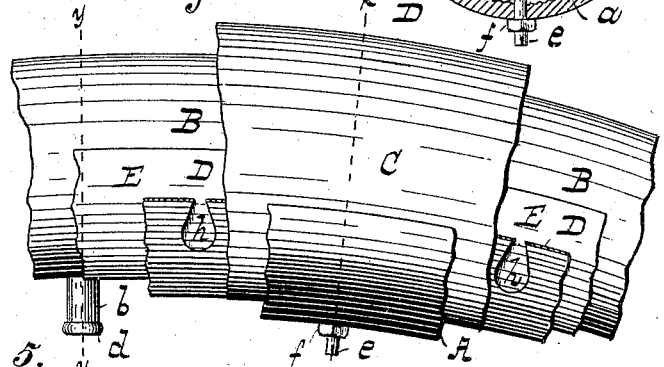
Fig. 2.
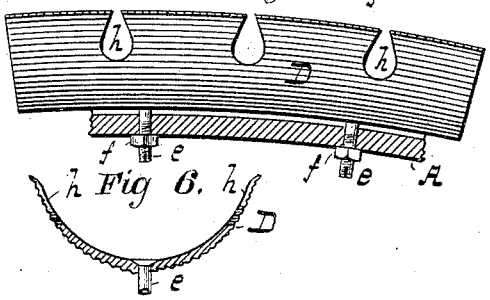
Fig. 5.
Fig. 6.
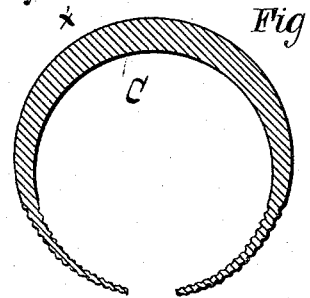
Fig. 7.
—WITNESSES—
Dan'l Fisher
Howard S. Krol
—INVENTOR—
George Thorn Reed,
by Geo. W. T. Howard,
Atty.

UNITED STATES PATENT OFFICE.

GEORGE THORN REED, OF BALTIMORE, MARYLAND, ASSIGNOR OF ONE-HALF TO HESTON A. CHEATHAM, OF SAME PLACE.

BICYCLE-WHEEL.

SPECIFICATION forming part of Letters Patent No. 476,216, dated May 31, 1892.

Application filed September 21, 1891. Serial No. 406,428. (No model.)

*To all whom it may concern:*

Be it known that I, GEORGE THORN REED, of Baltimore, Maryland, have invented certain Improvements in Bicycle-Wheels, of which the following is a specification.

My invention relates to bicycle-wheels having pneumatic tires which comprise rubber tubes that can be inflated and deflated at will.

An essential feature of my invention consists in firmly uniting a pneumatic tire to the rim of a wheel without the use of cement. The cohesion of the pneumatic tire and rim by my method is not affected by the inflated or deflated condition of the tire, but results from mechanical adaptation of the parts to each other, and can be easily separated and removed whenever required.

The tread of my tire consists of a rubber or other suitable covering which serves to protect the pneumatic tube from wear, abrasion, and puncture.

In the following description of my invention reference is made to the accompanying drawings, forming part thereof, and in which—

Figure 1 is an exterior side view of a bicycle-wheel embodying my improvements; Fig. 2, an enlarged side view of a part of the rim, tire, and their attachments. Fig. 3 is a cross-section of Fig. 2, taken on the dotted line $xx$. Fig. 4 is a cross-section of the same figure, taken on the dotted line $yy$. Figs. 5, 6, and 7 are details of the invention, also on an enlarged scale, and hereinafter fully described.

Referring to the drawings, A is the rim of the wheel, which is practically semicircular in cross-section. The hollow face $a$ of the rim A is serrated or roughened. (See Figs. 3 and 4.)

B is the pneumatic tire, consisting of a rubber tube adapted to hold air under pressure. The tube has a nozzle $b$, through which a suitable air-injector is used to inflate the pneumatic tube by forcing in air, and at the inner end of the nozzle $b$ is a flap-valve $c$, which prevents the escape of air from the tube when the air-injector is withdrawn, after which the cap $d$ is affixed.

C is a protecting covering envelope or tread for the air-tube, of crescent shape in cross-section, which is applied over the air-tube, with its edges resting in the groove or hollow face of the rim. The parts of the tread which are situated in the groove of the rim are preferably serrated or roughened to correspond with the roughened surfaces of the rim, and the tread is drawn tightly over the air-tube by means of a series of hollow segmental spring-clamps D, each one of which has bolts or screws $e$ projecting inwardly and radially from it. These bolts or screws pass through holes in the rim and are secured by lock-nuts $f$. Fig. 5 is an exterior side view of one of these spring-clamps attached to a part of the rim which is shown in section. Fig. 6 is a cross-section of Fig. 5 without the rim. The outer or convex surface of these clamps is serrated or roughened like the inner or grooved surface of the rim, and the edges are hooked and notched, as shown in Fig. 5. The curvature of the spring-clamps is such that when the bolts or screws are tightened or drawn downward the serrated sides of the clamps impinge firmly against the serrated sides of the covering or tread.

E is a layer of cloth or other suitable material to protect the tube from being chafed by the spring-clamps.

The operation of affixing a pneumatic tire to a rim by means of my invention consists as follows: The spring-clamps are first loosely attached to the rim of the wheel and the nuts placed on the bolts or screws, but not tightened up. The layer of cloth E is next placed on the spring-clamps and is suited to envelop the inflated tube which is laid in the spring-clamps and upon the cloth. The tread is next placed over the air-tube, and its edges are inserted between the rim and the segmental spring-clamps until they reach the bottom of the rim. The nuts $f$ on the bolts or screws $e$ are next screwed up, which draws the clamps toward the hollow face of the rim, and carry with them the tread, which is thus brought tightly in contact with the air-tube and rim, as shown in Figs. 3 and 4. If desired, the tread may be smooth, instead of roughened, as described, as the adjoining faces of the clamps and rim will effect indentations in the tread as the tire is brought into position.

By reference to Figs. 2 and 5 it will be seen that the edges of the spring-clamps are notched. The object of these notches denoted by $h$ is to increase the flexibility of the clamps, and thereby admit of their adaptation to the tread or covering. It also admits of clamps of a certain radius being applied to wheels of greater or less diameter without interfering with their effectiveness.

I claim as my invention—

In a wheel, the combination, with a hollow-faced rim, a pneumatic tube, and a tread partially inclosing the tube and resting in the said rim, of a series of spring-clamps interposed between the tube and the portions of the tread resting in the rim, said clamps having notched edges for the purpose specified, threaded bolts passing through the clamps and rim, and nuts on the bolts to draw the clamps and rim toward each other, substantially as described.

GEORGE THORN REED.

Witnesses:
WM. T. HOWARD,
DANL. FISHER.